Dec. 17, 1935.  W. MOSCHEL  2,024,242
APPARATUS FOR PRODUCING ANHYDROUS MAGNESIUM CHLORIDE
Original Filed June 17, 1930
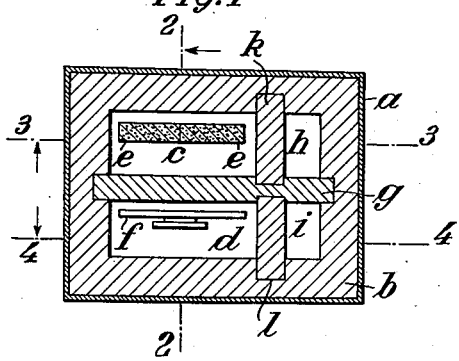
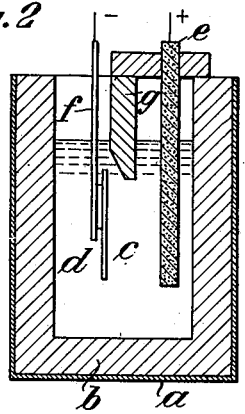
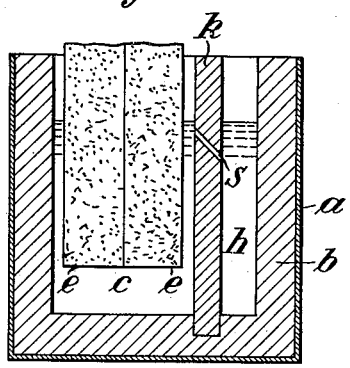
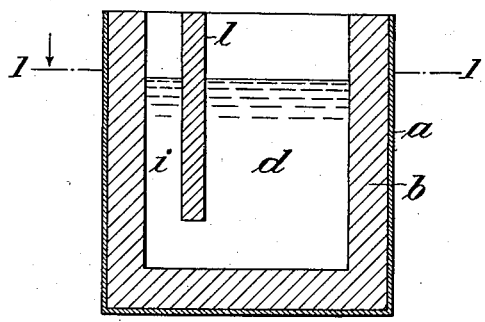
Inventor
Wilhelm Moschel.
By his Attorney Patented Dec. 17, 1935

2,024,242

UNITED STATES PATENT OFFICE 2,024,242

APPARATUS FOR PRODUCING ANHYDROUS MAGNESIUM CHLORIDE

Wilhelm Moschel, Bitterfeld, Germany, assignor, by mesne assignments, to Magnesium Development Corporation, a corporation of Delaware Original application June 17, 1930, Serial No. 461,724. Divided and this application November 23, 1934, Serial No. 754,479. In Germany June 20, 1929

3 Claims. (Cl. 204—19)

This invention relates to apparatus for the dehydration of hydrated magnesium chloride and the subsequent electrolysis of the anhydrous magnesium chloride formed therein, and is a divisional application of my copending application Serial No. 461,724, filed June 17, 1930 and bearing the title "Process of producing anhydrous magnesium chloride".

It has generally been recognized as essential in the production of magnesium from magnesium chloride by electrolysis of a fused electrolyte that the magnesium chloride consumed in the process should be replaced by magnesium chloride which is dehydrated as thoroughly as possible. On the other hand, it is well known to all those skilled in the art that the complete dehydration of the hydrates of magnesium chloride by treating them in a current of desiccated hydrochlorid acid—this being the only process hitherto feasible on a technical scale—offers great technical difficulties and is very expensive. An object of the present invention, therefore, is to employ such hydrates of magnesium chloride which are comparatively easily produceable, particularly the hydrate $MgCl_2.2H_2O$, directly for feeding the electrolytic cell and to effect complete dehydration in the electrolytic cell itself.

According to the present invention the hydrate to be treated is introduced into a fused mixture of chlorides, for example a mixture consisting of

|  | Per cent |
|---|---|
| Potassium chloride | 50 |
| Sodium chloride | 40 |
| Magnesium chloride | 10 | in such proportion that the content of the mixture in $MgCl_2$ is not allowed to rise above the proportion prevailing in natural carnallite. By maintaining this ratio it is possible to effect the dehydration of the magnesium chloride hydrates, particularly of the di-hydrate, without any perceptible decomposition of that salt into magnesium oxide and hydrochloric acid.

Example

Into 500 kgs. of a fused mixture of chlorides having a temperature of about 700° C. and containing besides alkali chlorides 12.6 percent of $MgCl_2$ and 1 percent of MgO, 135 kgs. of magnesium chloride di-hydrate consisting of 65.5 percent of $MgCl_2$, 3.9 percent of MgO, balance water, are gradually introduced. The melt is stirred for some time until the evolution of water vapours has ceased. 593 kgs. of an anhydrous melt are thus obtained containing 25.5 percent of $MgCl_2$ and 1.8 percent of MgO. The relatively small increase of the magnesium oxide contents is largely due to the small amounts of magnesium oxide contained in the di-hydrate salt as an impurity and introduced along therewith.

I have further found that it is possible to feed a bath in which electrolytic decomposition of a melt containing anhydrous magnesium chloride is carried out directly with the di-hydrate salt provided the aforesaid conditions are constantly maintained, since the limits of concentration specified in the foregoing example are entirely sufficient for carrying on the electrolysis. According to the present invention, a portion of the electrolyte impoverished in $MgCl_2$ is passed into a separate chamber, preferably forming a subdivision of the electrolytic cell and separated from its main portion by a suitable partition. Into this chamber the di-hydrate is introduced, preferably in a preheated condition, at such a rate that the $MgCl_2$ content in the fused product does not exceed 50 percent. Dehydration takes place quite smoothly in the chamber and without any perceptible decomposition of the magnesium chloride. The electrolyte thus replenished with regard to its $MgCl_2$ content is then led back into the main cell.

The annexed drawing shows a preferable mode of apparatus to be used in connection with the present invention. However, the invention is not limited to this type of apparatus but may be carried out in any device as long as the above-described conditions are fulfilled. Figure 1 represents a plan view and Figures 2 to 4 different sections of the device, the broken lines in Figure 1 and their respective numbers indicating the planes in which the different sections are taken.

In a trough-shaped container $a$ provided with a lining $b$ of ceramic material, an anode $e$ consisting of two plates of graphite and the iron cathode $f$ are inserted so as to enter into the electrolyte consisting of 50 percent of NaCl, 35 percent of KCl and 15 percent of $MgCl_2$. The container is spanned by a partition $g$ of chamotte which vertically extends just below the level of the electrolyte and divides the cell proper into an anodic chamber $c$ serving for the recovery of chlorine and a cathodic chamber $d$ in which the metal is collected. There are further provided chambers $h$ and $i$ separated from the main cell by partitions $k$ and $l$ of ceramic material. In partition $k$ (cf. Figure 3) extending down to the bottom of the container there is provided a narrow channel $s$ through which, owing to the buoyancy of the chlorine ascending in the anode chamber, some of the electrolyte is caused to enter into the chamber $h$. Into this chamber also the di-hydrate at the rate required by the invention is introduced and immediately gives off its water content by evaporation, whereupon the electrolyte replenished with regard to its magnesium chloride content enters chamber $i$ through a gap provided below partition $l$, and hence flows back into the main chamber. The continuous circulation of the electrolyte in the manner described is sufficient for maintaining the necessary temperature in chambers $h$ and $i$. However, it is also possible to individually heat these chambers in any known manner, for instance, by means of an alternating current.

The present invention is not limited to the dehydration of the di-hydrate $MgCl_2.2H_2O$, as other hydrates, such as the tetra-hydrate $MgCl_2.4H_2O$, may also be treated in a similar manner. However, the dehydration of other hydrates to a point corresponding to the di-hydrate when carried out in the usual manner, for example, in a reverberatory furnace, offers no difficulties. I therefore preferably employ the di-hydrate as the starting material in my process.

Another form of carrying out the present invention consists in supplying the magnesium chloride to the electrolyte by introducing the hydrates in an entirely separate container into the fused electrolyte which for this purpose must be led out of the cell proper. This mode may be advantageous when a large number of cells must be continually supplied with fresh electrolyte, as it is possible, in this case, to perform the regeneration of the electrolyte of a plurality of cells within a single apparatus.

I claim:—

1. An electrolytic cell comprising an electrolyte container, a substantially vertical partition extending down to the bottom of said container so as to form two substantially separate compartments within said container, another substantially vertical partition adapted to be only slightly immersed below the level of the electrolyte within said container and extending substantially at right angles to the first of said partitions so as to provide an anode chamber and a cathode chamber in one of the said compartments, an anode and a cathode in their respective chambers, means for passing a portion of the electrolyte contained in the first of said compartments into the other compartment, and means for returning the electrolyte into the first of said compartments.

2. An electrolytic cell comprising an electrolyte container, a substantially vertical partition extending down to the bottom of said container so as to form two substantially separate compartments within said container, another substantially vertical partition adapted to be only slightly immersed below the level of the electrolyte within said container and extending substantially at right angles to the first of said partitions so as to provide an anode chamber and a cathode chamber in one of the said compartments, an anode and a cathode in their respective chambers, a plurality of openings located in the first of said partitions and connecting the said compartments with each other in such a manner as to enable a circulating flow of the fused electrolyte between said compartments by virtue of the electrolytic action.

3. An electrolytic cell comprising an electrolyte container, a substantially vertical partition extending down to the bottom of said container so as to form two substantially separate compartments within said container, another substantially vertical partition adapted to be only slightly immersed below the level of the electrolyte within said container and extending substantially at right angles to the first of said partitions so as to provide an anode chamber and a cathode chamber in one of the said compartments, an anode and a cathode in their respective chambers, a narrow channel located in the upper part of said other partition and connecting the anode chamber with said other compartment, and a gap located below said other partition and connecting the cathode chamber with said other compartment.

WILHELM MOSCHEL.